United States Patent [19]
Archer

[11] 3,846,694
[45] Nov. 5, 1974

[54] CONSTANT POWER SUPPLY EMPLOYING A VARIABLE FREQUENCY INVERTER

[75] Inventor: Albert E. Archer, Yorba Linda, Calif.

[73] Assignee: John Fonseca, trustee, Alhambra, Calif.

[22] Filed: Mar. 30, 1973

[21] Appl. No.: 346,603

[52] U.S. Cl. .................................. 321/18, 321/19
[51] Int. Cl. ......................................... H02m 7/52
[58] Field of Search .................. 321/18, 19; 323/20

[56] References Cited
UNITED STATES PATENTS

| | | | |
|---|---|---|---|
| 3,391,322 | 7/1968 | Findley, Jr. et al. | 321/19 X |
| 3,452,266 | 6/1969 | Borden et al. | 321/43 X |
| 3,460,025 | 8/1969 | Prisco | 321/43 |
| 3,461,374 | 8/1969 | Rhyne, Jr. | 321/19 X |
| 3,487,291 | 12/1969 | Dowgiallo, Jr. | 323/20 X |
| 3,522,514 | 8/1970 | Tornberg | 321/19 X |
| 3,566,245 | 2/1971 | Blokker et al. | 321/19 X |
| 3,624,483 | 11/1971 | Genuit | 321/43 X |
| 3,718,852 | 2/1973 | Bailey | 321/19 |

Primary Examiner—William M. Shoop, Jr.
Attorney, Agent, or Firm—Howard A. Silber

[57] ABSTRACT

A power supply useful for delivering substantially constant power to a plasma arc lamp or other load includes a variable frequency inverter having a substantially fixed pulse width. A constant power control circuit adjusts the inverter frequency to compensate for deviation of the output power away from a linear approximation of a constant power curve. In the control circuit, signals proportional to the output current and voltage are fed to a function generator which implements the linear approximation function. An error signal derived by comparing the function generator output with a reference voltage controls the frequency of an oscillator which in turn establishes the triggering rate of silicon controlled rectifiers (SCRs) in the inverter. The SCRs commutate off after a relatively constant time period, thus inverter output is proportional to the SCR triggering frequency. Cooperation of the control circuit and inverter maintains the supply output power at a constant level.

15 Claims, 7 Drawing Figures

CONSTANT POWER SUPPLY EMPLOYING A VARIABLE FREQUENCY INVERTER

BACKGROUND OF THE INVENTION

1. Field of the Invention

The present invention relates to a power supply which delivers substantially constant power to a plasma arc lamp or other load, and particularly to such a power supply wherein the frequency of a variable frequency, fixed pulse width inverter is controlled in response to deviation of the output power from a linear approximation of a constant power curve.

2. Description of the Prior Art

Mercury, xenon and other plasma arc lamps are widely used in commercial movie projectors, for outdoor flood lighting and in other applications where high light levels are necessary. Such arc lamps require a very high voltage RF pulse for ionization to start the lamp. Then, after a brief transient period, the arc is maintained with a relatively low dc voltage. Typically, a xenon arc lamp may operate at 450 watts, using a voltage of about 18 volts and a current of about 25 amperes. Mercury arc lamps use a higher voltage and lower current. Regulation of power to the lamp is desirable to achieve a substantially constant output light level despite changes in ac line voltage or veriation in lamp performance due to electrode deterioration, fluctuations in ionization rate, etc. This is particularly important for movie projection application where changes in lamp intensity may result in audience annoyance. The usual lifetime of an arc lamp also is increased when the lamp is supplied with constant power.

In the past, dc power supplies for such plasma arc lamps generally have employed a transformer for stepping up or down the ac line voltage, together with a rectifier and filter connected to the transformer output. Voltage regulation is achieved using a regulator in series with the rectifier dc output.

Since he transformer is placed directly across the ac line and handles the low frequency (60 Hz) input, it necessarily must be quite large and be capable of dissipating the heat which is developed in the transformer at this low frequency. Further, since the line voltage varies considerably both above and below the nominal 115 volts, the series regulator must be capable of handling a large voltage swing. Thus for low voltage supplies it is not unusual that approximately one-half of the available output power is dissipated in the regulator.

Series regulation of the dc output voltage is shown in the U.S. Pat. No. 3,356,930 to Lupoli et al. In this supply, a pair of Darlington-connected transistors operated in the switching mode are placed in series with the output of a filtered dc source. A flip-flop rapidly switches the transistors on and off according to a time schedule which maintains the output voltage at a predetermined value. The flip-flop frequency is established by comparing the supply dc output voltage with a reference voltage. Provision is made to limit the output to below a preset maximum power level.

Various approaches had been suggested to eliminate the low frequency transformer from a regulated dc power supply. In one approach, the line voltage is rectified, regulated by a switching regulator, and converted to a high frequency signal by an inverter. The resulting high frequency voltage is stepped down through a high frequency transformer which is much smaller in size than a low frequency transformer. The stepped down, high frequency signal is presented to the load through a series rectifier. This circuit has the disadvantage that a large percentage of the available power is lost in the series regulation. Further, load regulation generally is poor because the switching regulator does not sense the voltage or power delivered to the load.

The power supply shown in the U.S. Pat. No. 3,564,384 to Adler uses an inverter to convert the rectified line voltage to a high frequency signal for input to the step down transformer. The inverter operates at a fixed frequency, but with a duty cycle which is controlled in response to the sensed supply output voltage. The output voltage controls a magnetic amplifier which establishes the pulse width or time duration during which the inverter switches are on. This approach also has the benefit of permitting use of a small sized, high frequency transformer. However, only voltage regulation is achieved, and the use of a magnetic amplifier increases cost and may limit the system response time.

Prior art power supplies having constant power control generally have employed series regulation. In one approach, a pair of signals proportional to the supply output voltage and current are multiplied together to obtain a control signal proportional to the output power. This signal is used to control a series switching regulator. In the phase controlled ballast shown in the U.S. Pat. No. 3,590,316 to Engel, a solid state wattmeter receives signals proportional to the current and voltage provided to a load. These are combined to generate a signal proportional to the logarithm of their product. This logarithmic signal is converted to a time averaged, anti-logarithmic output which controls the triggering of a semiconductor switch to maintain the wattage output to the load at a predetermined value.

An object of the present invention is to provide an improved power supply having constant power output and useful for driving a plasma arc lamp.

SUMMARY OF THE INVENTION

This objective is achieved by providing a power supply in which the output power is controlled by varying the frequency of a constant pulse width inverter in response to sensed deviation of the output power from a linear approximation of a constant power curve. A control circuit appropriately adjusts the inverter frequency so as to return the power output to the desired value.

The inverter includes a pair of silicon controlled rectifiers which are alternately switched on at a frequency established by the constant power control circuit. Each SCR remains on for a relatively constant time period after which it is turned off by circuit commutation. The inverter output is converted to the desired output voltage level by a high frequency transformer of small size. The transformer output is rectified, filtered and supplied to a plasma arc lamp or other load.

The constant power control circuit includes an output function generator which receives signals proportional to the power supply output voltage and current. The function generator utilizes a linear approximation of a constant power curve, producing an output signal $V_f$ which is of certain value if the sensed output power is at the correct level. Any deviation of the output power away from the constant power linear approximation causes the voltage $V_f$ to vary from the certain value, producing an error signal. The error signal alters the frequency of a relaxation oscillator which establishes the triggering rate of the inverter SCR's.

The frequency is controlled so that if the output power drops below the desired value, the frequency is increased, thereby increasing the duty cycle and hence the output of the variable frequency, fixed pulse width inverter. This compensates for the sensed drop in supply output power. Similarly, should the output power be too high, the inverter frequency is decreased, causing a concomitant decrease in output power to correct for the sensed deviation. In this manner, constant power regulation is achieved.

BRIEF DESCRIPTION OF THE DRAWINGS

A detailed description of the invention will be made with reference to the accompanying drawings, wherein like numerals designate corresponding elements in the several figures.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Figure 1:
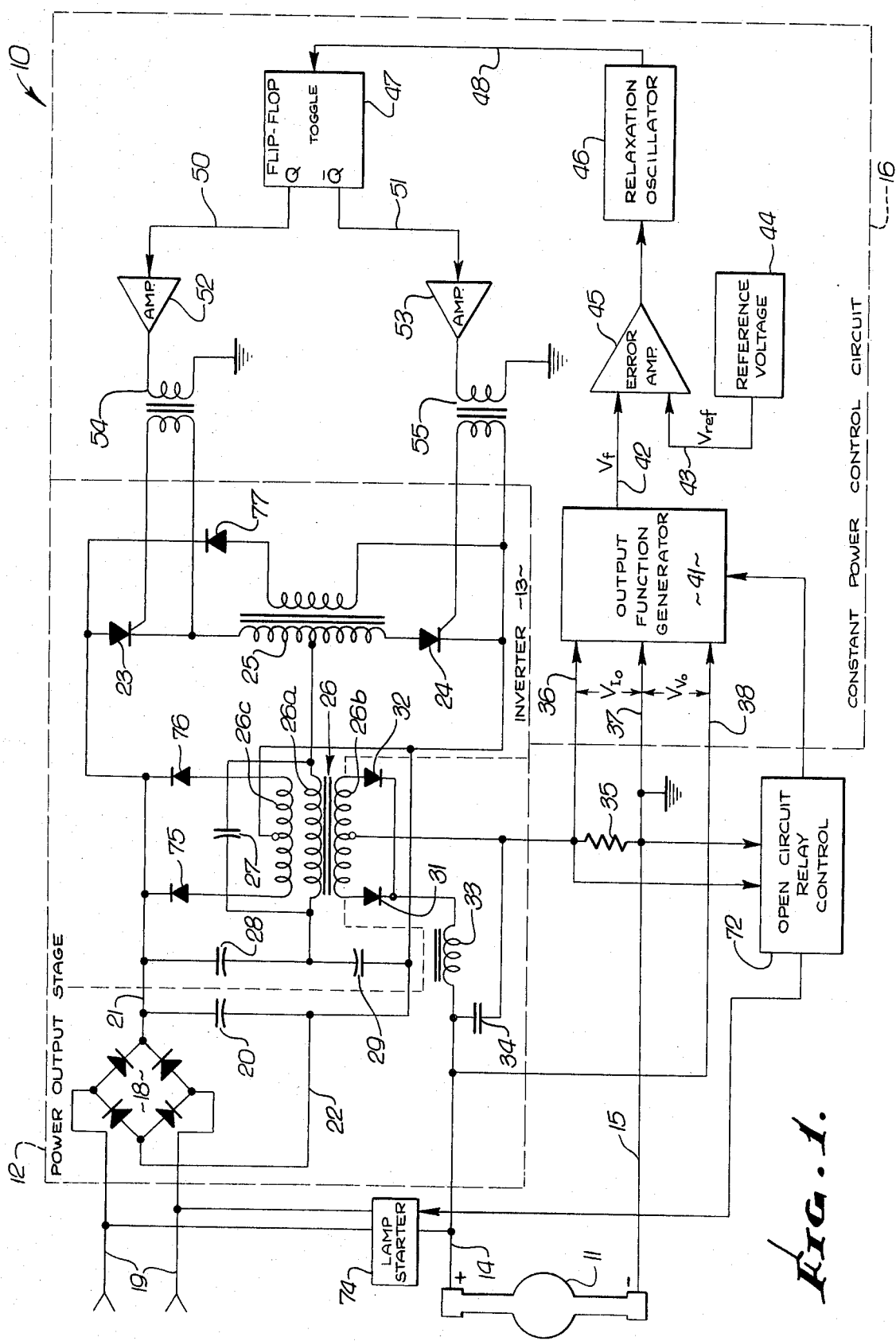
FIG. 1 is an electrical block diagram of the inventive arc lamp power supply, the power output stage being shown schematically.

As shown in FIG. 1, the inventive power supply 10 advantageously is used to provide constant power to a plasma arc lamp 11. To this end, a power output stage 12 utilizing a variable frequency inverter 13 provides direct current to the lamp 11 via the lines 14, 15. A control circuit 16 constantly monitors the voltage and current supplied to the lamp 11. Should any variation in power occur, the control circuit 16 alters the frequency of the output stage inverter 13. This appropriately corrects the power supplied to the lamp 11 to compensate for the sensed variation. Constant power output is achieved.

In the power output stage 12, a diode bridge 18 rectifies ac power received from a source via the lines 19. The dc output from the bridge 18 is filtered by a capacitor 20 and supplied via the lines 21, 22 to the inverter 13.

The inverter 13 includes a pair of silicon controlled rectifiers 23, 24 which alternately are triggered on at a frequency established by the control circuit 16. Each silicon controlled rectifier (SCR) 23, 24 is commutated off by a circuit including an inductor 25, the primary winding 26a of the inverter output transformer 26, a capacitor 27 shunted across the winding 26a, and a pair of capacitors 28, 29. The time during which each SCR 23, 24 remains on is established by the values of these components, and is substantially constant. As a result, the power output of the inverter 13 is determined by the frequency at which the SCR's 23, 24 are triggered. The higher the frequency, the greater the duty cycle of the SCR's and the more power is delivered by the output stage 12.

Otuput from the inverter 13 is derived via the secondary winding 26b of the transformer 26. The ac power appearing across this winding is rectified by the diodes 31, 32 and filtered by an inducator 33 and a capacitor 34. The filtered dc output is provided via the lines 14, 15 to the lamp 11.

The power output from the supply 10 is monitored by the control circuit 16. Thus a voltage $V_{Io}$ proportional to the supply output current Io is developed across a resistor 35 in series with the line 15. This voltage, provided via the lines 36, 37, has the value $V_{Io} = RI_o$ where R is the resistance of the resistor 35. A voltage $V_{Vo}$ proportional to the supply output voltage Vo is provided to the control circuit 16 via the lines 37, 38. In the embodiment of FIG. 1, the output voltage itself is supplied to the circuit 16, so that $V_{Vo} = V_o$. Of course, a voltage divider could be used so that the signal $V_{Vo}$ is different from, but proportional to $V_o$.

Figure 2:
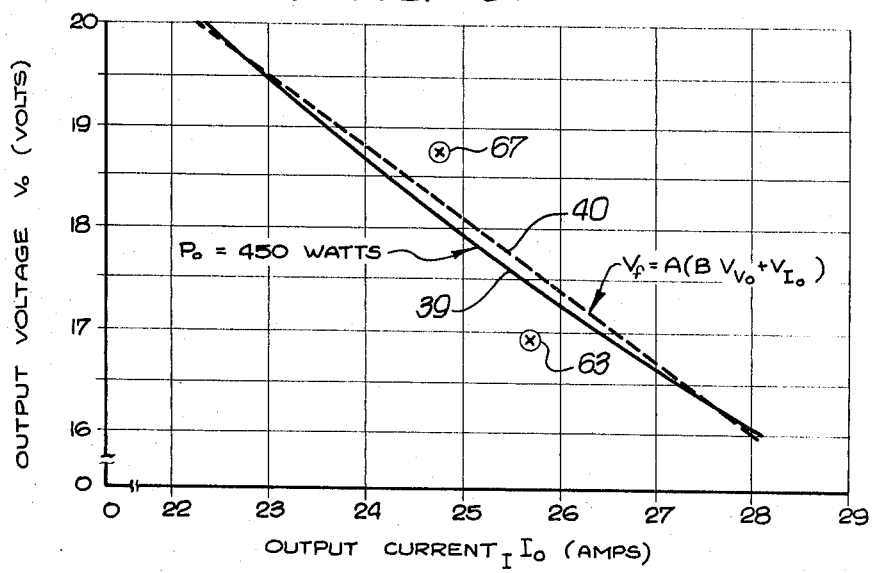
FIG. 2 is a graph of a linear approximation of the constant power curve, as employed in the supply of FIG. 1.

The control circuit 16 functions in conjunction with the output stage 12 to deliver regulated power to the lamp 11. Referring to FIG. 2, there is shown a constant power curve 39 for a typical arc lamp 11 having a nominal power rating $P_o = 450$ watts, with an operating voltage of $18 \pm 2$ volts. The constant power curve 39 is slightly arcuate. In accordance with the present invention, the control circuit 16 operates to a linear approximation of this power curve, such approximation being indicated by the straight line 40 in FIG. 2. In general, the linear approximation may be represented by the relationship:

$$V_f = A[BV_{Vo} + V_{Io}]$$

(Eq. 1)

where A and B are system constants, and $V_f$ is a voltage which will be of fixed value so long as the sensed output voltage Vhd o and current $I_o$ have a product which lies along the linear approximation curve 40. If the power output should deviate from this linear approximation, the value $V_f$ will differ from the fixed value, indicating that the power supply 10 output has deviated from the desired amount and requires correction.

To accomplish such correction, the control circuit 16 includes an output function generator 41 which receives as inputs the voltages $V_{Vo}$ and $V_{Io}$ present on the lines 36, 38. As described below in conjunction with FIG. 4, the generator 41 implements equation 1 and provides on a line 42 an output voltage $V_f$ in accordance with that equation. This voltage $V_f$ is compared with a constant reference voltage $V_{ref}$ supplied on a line 43 from a source 44. The voltage $V_{ref}$ corresponds to the fixed value $V_f$ which is produced if the output power correctly lies on the linear approximation curve 40.

By way of example, the constant power curve 39 of FIG. 2 may be linearly approximated by the function:

$$V_f = 10.7[0.014V_o + 0.01I_o]$$

(Eq. 2)

wherein, with reference to equation 1, $A = 10.7$; $B = 0.014$; $V_{Vo} = V_o$; and $V_{Io} = 0.01I_o$. For regulation to a constant power $P_o = 450$ watts, equation 2 has the value $V_f = 5.35$ volts. Accordingly a reference signal $V_{ref} = 5.35$ volts is used for comparison. If the current $I_o$ or voltage $V_o$ should change such that the output power deviated from the linear approximation of the $P_o = 450$ watt curve 39, the output $V_f$ of the function generator 41 will differ from 5.35 volts. This difference, sensed by an error amplifier 45, causes the inverter 13 frequency to change in a direction so as to compensate for the error.

Figure 3A:
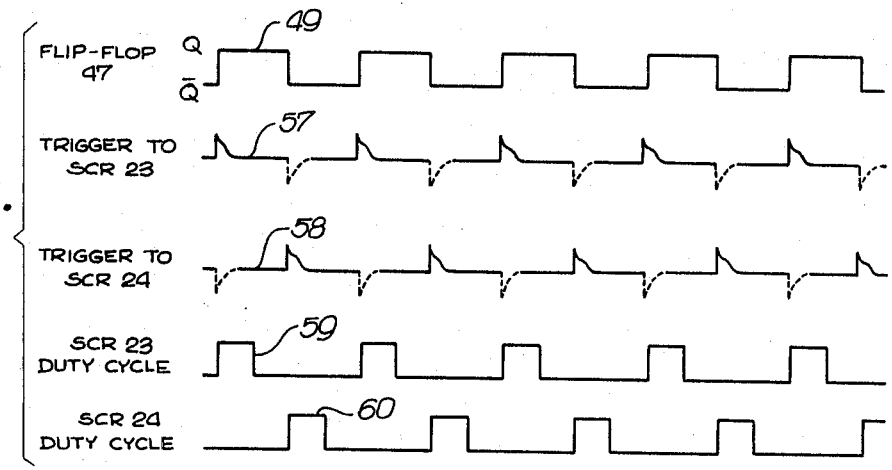
FIGS. 3A, 3B and 3C are waveforms illustrating the change in inverter frequency and SCR duty cycle as the power supply of FIG. 1 compensates for a variation in power output.

The inverter 13 frequency is established by a relaxation oscillator 46 controlled by the output of the error amplifier 45. The oscillator 46 toggles a flip-flop 47. Thus successive oscillator 46 pulses on the line 48 cause the flip-flop 47 to alternate between its two stable stress, as illustrated by the waveform 49 of FIG. 3A. This produces alternating outputs on the lines 50, 51 at a switching rate established by the oscillator 46 frequency. The flip-flop 47 outputs are amplified by a pair of power amplifiers 52, 53 to provide via respective pulse transformers 54, 55 gate trigger pulses to the SCR's 23, 24 in the inverter 13. The waveshapes 57, 58 (FIG. 3A) show such trigger pulses.

Thus the SCR's 23, 24 alternately are switched on at a rate established by the oscillator 46. As indicated by the waveforms 59, 60 of FIG. 3, each SCR 23, 24 remains on for a substantially constant period of time established by the commutation components of the inverter 13. The commutation time is shorter than the minimum period of the oscillator 46. The inverter 13 output derived via the transformer 26 is proportional to the duty cycle of the SCR's 23, 24. Accordingly, the frequency at which the SCR's 23, 24 are triggered on determines the power output from the stage 12. Since this triggering frequency is controlled by an error signal indicative of a deviation in output power, the control circuit 16 and the power output stage 12 function as desired to maintain the power output at a regulated value.

Figure 3B:
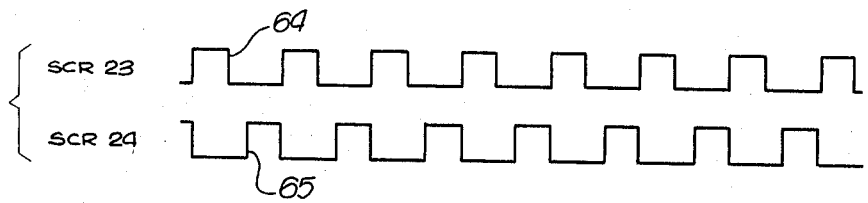
Figure 3C:
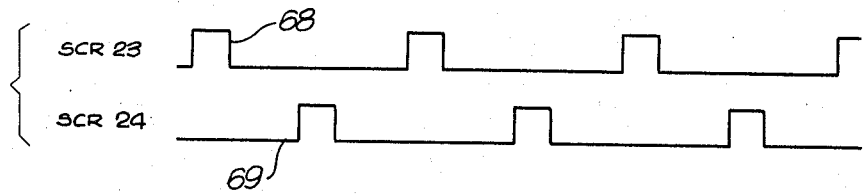

The waveforms of FIG. 3B indicate how the inverter 13 frequency is modified when the output power from the supply 10 drops below the desired value. This may occur, for example, if the ac power supplied via the lines 19 were to drop from 115 volts to 105 volts. The output power will be below the linear approximation curve 40, for example at a point 63 on the graph of FIG. 2. The reduced output voltage $V_o$ and/or current $I_o$ causes a concomitant decrease in the value $V_f$ from the output function generator 41. The resultant output from the error amplifier 45 causes the frequency of the relaxation oscillator 46 to increase, concomitantly increasing the frequency at which the SCR's 23, 24 are triggered. The ON time of each SCR, established by the commutation components of the inverter 13, remains substantially unchanged. The result is an increased SCR duty cycle, as shown by the waveforms 64, 65 of FIG. 3B. The corresponding increased power output compensates for the sensed drop in power caused by the decrease in ac line voltage. The output power is returned to a value lying on the linear approximation curve 40.

Should the power to the lamp 11 increase, as for example to a point 67 (FIG. 2) above the linear approximation curve 40, the control circuit 16 will cause a concomitant decrease in power from the output stage 12. The voltage $V_f$ from the output function generator 41 will be greater then the reference voltage $V_{ref}$, causing a decrease in frequency of the oscillator 46. This will reduce the rate at which the SCR's 23, 24 are triggered, as indicated by the SCR duty cycle waveforms 68, 69 of FIG. 3C. The reduced duty cycle will decrease the power supplied from the output stage 12, appropriately compensating for the sensed increase in power. Thus the control circuit 16 and the power output stage 12 cooperate to provide substantially constant power from the supply 10.

The operation just described is modified somewhat under open circuit or short circuit load conditions. Before the lamp 11 is ignited, an open circuit condition exists in which no current is drawn by the lamp. This condition is sensed by an open circuit relay control 72, described below, which receives the signal $V_{Io}$ via the lines 36, 37. The control circuit 72 includes a relay 73 (FIG. 4A) the contacts of which are closed when no current is being drawn by the load 11. The relay 73 enables a conventional lamp starter 74 used to ignite the plasma arc lamp 11. The closed relay 73 contacts also disable the output function generator 41, permitting the relaxation oscillator 46 to run at maximum frequency. During this no-load condition, the capacitor 27 functions to make the SCR 23, 24 commutation time slightly longer than during normal load conditions. A pair of diodes 75, 76 in conjunction with a winding 26c damp the voltage across the transformer 26.

As soon as the lamp 11 arc has been ignited, current will be drawn from the supply 10. The resultant non-zero voltage $V_{Io}$ will cause the control circuit 72 to open the relay 73 contacts. This disables the lamp starter 74, which no longer is needed since the lamp 11 has been ignited, and enables the output function generator 41. The generator 41 and the control circuit 16 then function in the normal manner described above to provide constant power to the lamp 11.

Under short circuit conditions, as when the arc lamp 11 electrodes short together, the oscillator 46 runs at minimum frequency. SCR 23, 24 commutation is controlled by the capacitors 28, 29, the inductor 25 and a diode 77 shunted across the SCR's in series with a winding 25a coupled to the inductor 25. Power output to the shorted lamp 11 is minimized.

Figure 4A:
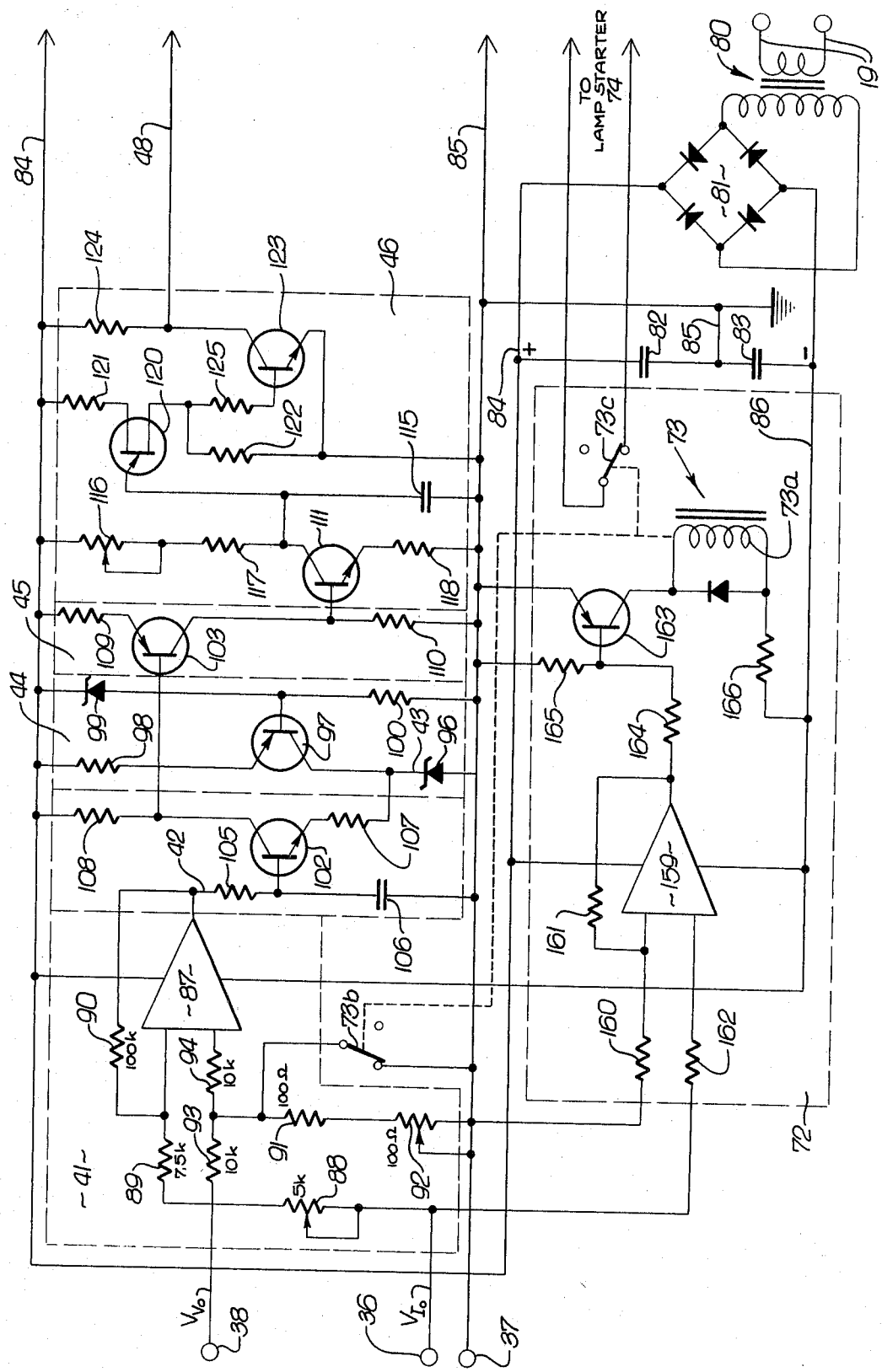
FIGS. 4A and 4B together form an electrical schematic diagram of the power supply components shown in block form in FIG. 1.
Figure 4B:
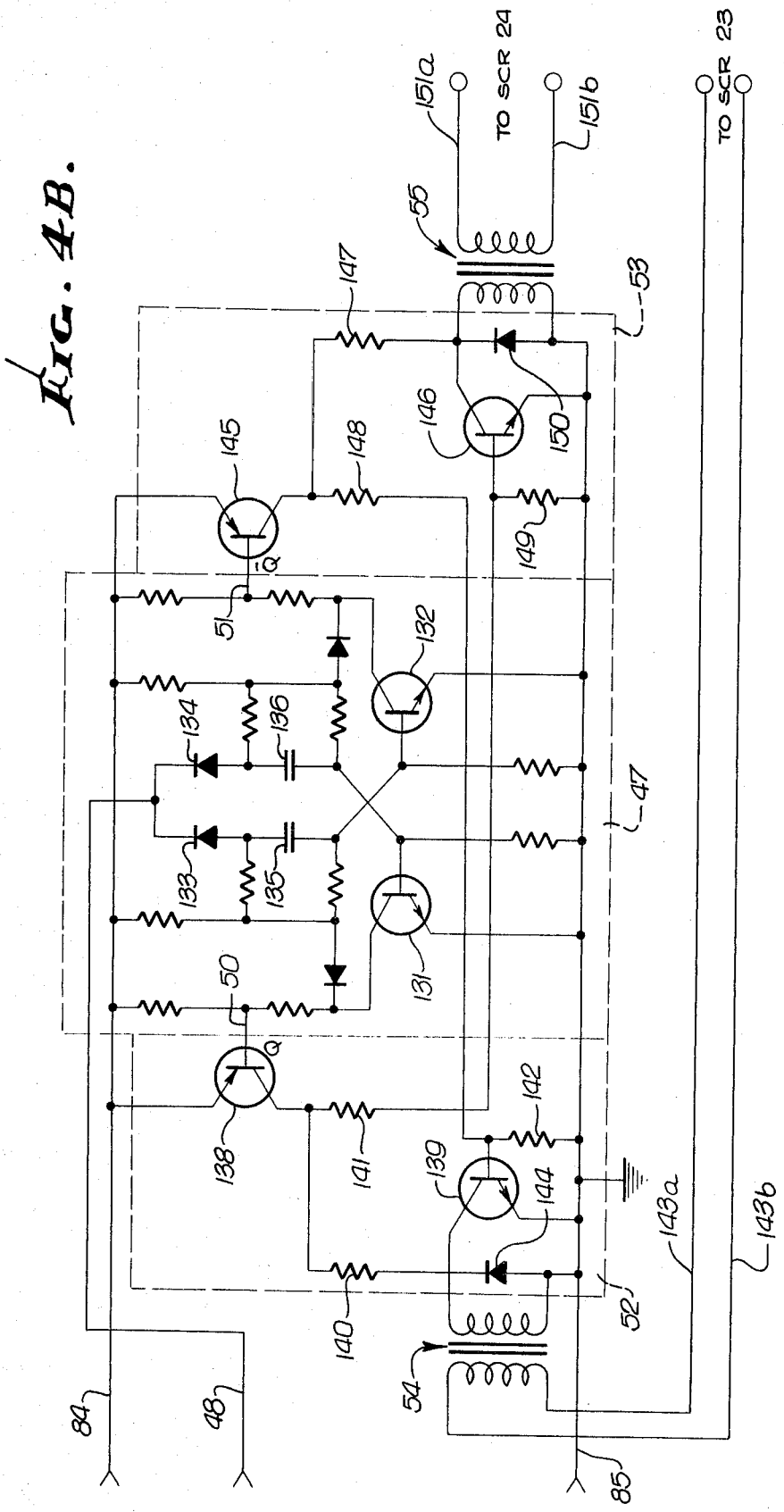

An illustrative embodiment of the constant power control circuit 16 and the open circuit relay control 72 are shown in FIGS. 4A and 4B. Referring thereto, the circuits 16, 72 are powered by a transformer 80, a bridge rectifier 81 and a pair of filter capacitors 82, 83 receiving an ac input via the lines 19. This arrangement provides a positive dc voltage between a line 84 and a common ground line 85, and a negative voltage between a line 86 and ground.

The output function generator 41 includes an operational amplifier 87 (typically a Motorola type 741) and the associated resistors 88 through 94. The generator 41 implements equation 1 above. The gain of the amplifier 87, and hence the value A of the equation 1, is set by the ratio of the sum of resistances 88 and 89 to the value of the feedback resistor 90. The constant B is set by the sum of the resistances 91 and 92 divided by the sum of resistances 91, 92 and 93. In FIG. 4A, the values specified for the resistors 88-94 appropriately implement the values A, B of equation 2 above. In this case, the resistor 35 (FIG. 1) has a value of 0.01 ohms so that $V_{Io} = 0.01\, I_o$. Accordingly, the generator 41 output on the line 42 is the voltage $V_f$ given by equation 2 above.

The reference voltage $V_{ref}$ on the line 43 is derived across a zener diode 96 which is supplied with constant current via a transistor 97 having an emitter load resistor 98. The base of the transistor 97 is maintained at a constant voltage by a zener diode 99 in series with a resistor 100. Thus the components 96 through 100 constitute the reference voltage source 44 of FIG. 1.

The error amplifier 45 (FIG. 1) is implemented by the transistors 102, 103 and the components associated therewith. The voltage $V_f$ is supplied to the base of the transistor 102 via a resistor 105 and a bypass capacitor 106. The emitter of the transistor 102 is maintained at the reference voltage $V_{ref}$ supplied via a resistor 107. A difference voltage appears across the collector load resistor 108 and is amplified by the transistor 103, which has emitter and collector load resistors 109 and 110. The voltage developed across the load resistor 110 establishes the current through a transistor 111, thereby controlling the oscillator 46 frequency as described below.

In the relaxation oscillator 46, a capacitor 115 is charged via the resistors 116, 117. The capacitor 115 is paralleled by the collector to emitter path of the transistor 111 and a load resistor 118. As a result, some of the current flowing through the resistors 116, 117 is shunted thorugh the transistor 111 and the resistor 118 rather than being fed to the capacitor 115. This in effect changes the charging current, and hence the charging time of the capacitor 115 as a function of the output from the error amplifier 45. The charging time of the capacitor 115 will be increased when the sensed supply 11 output power is above the desired value. In such instance, the voltage $V_f$ will be greater than the reference voltage $V_{ref}$ and the error amplifier 45 output will cause increased conduction through the shunting transistor 111. Conversely, the capacitor 115 charging time will decrease when insufficient supply 11 power output is detected.

The capacitor 115 is connected to the gate of a unijunction transistor (UJT) 120. When the capacitor 115 charges up to a preset value, the unijunction transistor 120 conducts, discharging the capacitor 115 through the gate to drain path. The resultant pulse through the UJT load resistors 121, 122 is amplified by a transistor 123 having associated resistors 124, 125. This produces an output pulse on the line 48. The capacitor 115 again begins to charge, repeating the oscillation cycle.

The flip-flop 47 (FIG. 4B) is conventional, and consists of the transistors 131, 132 and the associated resistors, capacitors and diodes. The oscillator 46 pulses on the line 48 are supplied to the toggle input, which consists of a pair of diodes 133, 134 connected via a pair of capacitors 135, 136 to the gates of the transistors 131, 132. Successive pulses on the line 48 cause the flip-flop 47 to alternate between the two stable states in which the respective transistor 131 or 132 is conducting.

The amplifier 52 consists of the transistors 138 and 139 and the associated resistors 140-142. When the flip-flop 47 goes to the Q state, the transistor 131 starts to conduct, causing the transistor 138 to go on. Current flows through the transistor 138, the resistor 140 and the primary of the transistor 54. A trigger pulse is supplied to the SCR 23 via the lines 143a 143b. When the flip-flop 47 switches to the Q̄ state, the transistor 139 conducts, providing a discharge path for any energy stored in the transformer 54, the primary of which is clamped by a diode 144. The amplifier 53 consists of the transistors 145, 146, the resistors 147-149 and the diode 150, all of which function like the corresponding parts of the amplifier 52. When the flip-flop 47 switches to the Q̄ state, a trigger pulse is supplied from the transformer 55 via the lines 151a, 151b to the SCR 24.

The open circuit relay control 72 (FIG. 4A) includes an operational amplifier 159 (typically a Motorola type 741) and its associated resistors 160-162 used to amplify the current indicating signal $V_{Io}$. When no current is being drawn by the load 11, the output from the amplifier 159 is insufficient to turn on a transistor 163. Since the coil 73a of the relay 73 is connected in the collector circuit of the transistor 163, the relay 73 remains in the unenergized condition shown, with the contacts 73b, 73c both closed. The contacts 73b short the resistors 91, 92 in the output function generator 41, thereby causing minimum voltage output from that circuit. As a result, supply 11 output is maximized, as described above. The other closed relay contacts 73c enable operation of the lamp starter 74. When the lamp 11 starts to draw current, the value $V_{Io}$ increases. As a result, an output from the amplifier 159 is supplied via a pair of resistors 164, 165 to the transistor 163. This causes current to flow through the transistor 163, the relay coil 73a and a resistor 166, thereby energizing the relay 73. This opens the relay contacts 73b, enabling normal operation of the output function generator 41. It also opens the relay contacts 73c, disabling the lamp starter 74 which no longer is needed since the lamp 11 is ignited.

Thus there is provided a power supply which senses output power deviation from a linear approximation of the constant power curve, and in response thereto corrects the frequency of a variable frequency, fixed pulse width inverter so as to change the power output to compensate for the sensed variation. The resultant constant power may increase the life time of a typical plasma arc lamp, and may result in more constant light output from that lamp. The inventive power supply need not be used to drive an arc lamp, but could be used for any application wherein substantially constant power is desired.

Intending to claim all novel, useful and unobvious features shown or described, the inventor makes the following

We claim:

1. A power supply having regulated power output, comprising:
    a power output stage including a variable frequency, substantially constant pulse width inverter for supplying dc power to a load, and
    constant power control circuit means for sensing deviation of the supply output power from a linear approximation of a constant power curve and for adjusting the frequency of said inverter to compensate for such sensed deviation, said control circuit and said output stage thereby cooperating to maintain the output power from said supply at a constant value.

2. A power supply according to claim 1 wherein said control circuit comprises;
    a function generator receiving signals proportional to the supply output voltage and current, said generator providing an output voltage which is of certain value if the supply output lies along said linear approximation, and means for adjusting the inverter frequency in response to variation of the function generator output away from said certain value.

3. A power supply according to claim 2 wherein said function generator implements the function $V_f = A[BV_{Vo} + V_{Io}]$, wherein A and B are constants, wherein $V_{Vo}$ and $V_{Io}$ are voltages proportional respectively to the supply output voltage and current, and where $V_f$ is the output voltage obtained from said generator.

4. A power supply according to claim 3 wherein said means for adjusting the frequency comprises:

an oscillator, means for supplying a reference voltage $V_{ref}$ equal to said certain value, means for controlling the frequency of said oscillator in response to the difference voltage between $V_f$ and $V_{ref}$, and means for changing the frequency of said inverter to correspond to said oscillator frequency.

5. A power supply according to claim 4 wherein said means for changing includes:

a flip-flop toggled in response to the output of said oscillator, pulse supply means for providing trigger pulses to switching devices in said inverter in response to toggling of said flip-flop.

6. A power supply according to claim 1 wherein said inverter includes at least one semiconductive switching device which is switched on at a frequency established by said control circuit means, and which remains on for a substantially constant time duration less than the minimum period of the minimum frequency of said inverter.

7. A power supply according to claim 6 wherein said semiconductor switching device comprises a silicon controlled rectifier, said rectifier being commutated off by other circuit components of said inverter.

8. In combination, a power supply according to claim 1, together with a plasma arc lamp connected to receive constant power from said supply.

9. A power supply according to claim 2 and adapted for use with an arc lamp load, said supply further comprising;

means for sensing when no current is supplied to said load, whereupon said output function generator is disabled and a starter for said lamp is enabled.

10. In a power supply of the type wherein rectified ac line voltage is provided to a high frequency inverter, the output of said inverter being supplied via a transformer and a rectifier to a load, the improvement for regulating said supply to obtain substantially constant output power wherein said inverter is of adjustable frequency, and comprising:

function generator means for providing an output voltage $V_f = A[BV_{Vo} + V_{Io}]$ in response to input voltages $V_{Vo}$ and $V_{Io}$ proportional respectively to the output voltage and current supplied to said load, A and B being constants, an oscillator, error voltage means for controlling the frequency of said oscillator in response to the difference between said voltage $V_f$ and a fixed reference voltage, and means, interconnecting said oscillator and said inverter, for adjusting the frequency of said inverter to correspond to said oscillator frequency.

11. A power supply according to claim 10, wherein said oscillator comprises a relaxation oscillator, said oscillator frequency being established by the rate at which a capacitor is charged, and wherein said error voltage means controls said capacitor charging rate in response to said voltage difference.

12. A power supply according to claim 10, wherein said inverter utilizes at least one silicon controlled rectifier triggered on at a rate established by said oscillator frequency, and wherein said rectifier is commutated off after a relatively fixed time period.

13. A power supply according to claim 12, wherein said inverter utilizes a pair of silicon controlled rectifiers each commutated off after a relatively fixed time period, said means for adjusting comprising:

a bistable multivibrator, said multivibrator being alternatively switched between its first and second stable states in response to pulses from said oscillator, and first and second triggering means each providing a triggering pulse to a respective one of said silicon controlled rectifiers when said multivibrator is switched into the respective first or second stable state.

14. A power supply according to claim 13, wherein said inverter comprises an inductor connected in series with said two silicon controlled rectifiers across the rectified ac line source, a pair of commutation capacitors connected in series across said rectified ac line source, and an output transformer having a primary winding connected between a tap on said inductor and the common junction of said commutation capacitors, the values of said inductor and said capacitors establishing said fixed time period during which each silicon controlled rectifier remains on, said time period being shorter than the period of said oscillator at maximum frequency.

15. A power supply according to claim 10, further comprising means for causing said oscillator to operate at maximum frequency when no current is being drawn by said load.

* * * * *